United States Patent
Hsia et al.

(10) Patent No.: US 9,163,818 B2
(45) Date of Patent: Oct. 20, 2015

(54) LINEAR SOLID-STATE LIGHTING WITH DEGENERATE VOLTAGE SENSING FREE OF FIRE AND SHOCK HAZARDS

(71) Applicant: Lightel Technologies, Inc., Renton, WA (US)

(72) Inventors: Chungho Hsia, Bellevue, WA (US); Pai-Sheng Shen, Bellevue, WA (US)

(73) Assignee: Lightel Technologies, Inc., Renton, WA (US)

(*) Notice: Subject to any disclaimer, the term of this patent is extended or adjusted under 35 U.S.C. 154(b) by 208 days.

(21) Appl. No.: 14/135,116

(22) Filed: Dec. 19, 2013

(65) Prior Publication Data

US 2014/0104824 A1  Apr. 17, 2014

Related U.S. Application Data (63) Continuation-in-part of application No. 13/525,249, filed on Jun. 15, 2012, now Pat. No. 8,749,167.

(51) Int. Cl.

| | |
|---|---|
| F21S 4/00 | (2006.01) |
| F21V 25/12 | (2006.01) |
| F21V 23/04 | (2006.01) |
| F21K 99/00 | (2010.01) |
| H05B 33/08 | (2006.01) |
| F21V 25/04 | (2006.01) |
| F21Y 101/02 | (2006.01) |

(52) U.S. Cl.
CPC .............. *F21V 25/12* (2013.01); *F21K 9/175* (2013.01); *F21V 23/04* (2013.01); *F21V 25/04* (2013.01); *H05B 33/0803* (2013.01); *H05B 33/0806* (2013.01); *F21Y 2101/02* (2013.01); *Y02B 20/341* (2013.01)

(58) Field of Classification Search
CPC ........................................................ F21S 4/00
See application file for complete search history.

(56) References Cited

U.S. PATENT DOCUMENTS

| | | | | |
|---|---|---|---|---|
| 8,459,831 | B2 * | 6/2013 | Hsia ........................... | F21K 9/17 362/217.1 |
| 8,749,167 | B2 * | 6/2014 | Hsia ........................ | F21V 25/00 315/209 R |

* cited by examiner

*Primary Examiner* — Hai L Nguyen
(74) *Attorney, Agent, or Firm* — Han IP Corporation (57) ABSTRACT

A linear light-emitting diode (LED)-based solid-state universal lamp using a degenerate voltage sensing and control mechanism operates normally in both single-ended and double-ended linear tube lamp fixtures. The degenerate voltage sensing and control mechanism automatically detects power source configuration in the fixture and makes proper management so that the universal lamp works in any fixtures without operational uncertainty or risk of fire. When used with shock protection switches in the two lamp bases at two opposite ends, the universal lamp fully protects a person from possible electric shock during initial installation and re-lamping.

12 Claims, 8 Drawing Sheets

FIG. 1

PRIOR ART

PRIOR ART

FIG. 4

PRIOR ART

FIG. 5

PRIOR ART

LINEAR SOLID-STATE LIGHTING WITH DEGENERATE VOLTAGE SENSING FREE OF FIRE AND SHOCK HAZARDS

CROSS REFERENCE TO RELATED PATENT APPLICATION

This application is a continuation-in-part of U.S. patent application Ser. No. 13/525,249, filed Jun. 15, 2012, now pending and incorporated herein by reference in its entirety.

BACKGROUND

1. Technical Field

This invention relates to linear light-emitting diode (LED) lamps that work with any linear tube lamp fixtures configured as single-ended or double-ended, and more particularly to a universal, shock and fire hazard-free linear LED tube lamp with a shock-protection mechanism.

2. Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In a retrofit application of a linear LED tube (LLT) lamp to replace an existing fluorescent tube, one must remove the starter or ballast because the LLT lamp does not need a high voltage to ionize the gases inside the gas-filled fluorescent tube before sustaining continuous lighting. LLT lamps operating at the AC mains, such as 110, 220, and 277VAC, have one construction issue related to product safety and needed to be resolved prior to wide field deployment. This kind of LLT lamps always fails a safety test, which measures through lamp leakage current. Because the line and the neutral of the AC mains apply to both opposite ends of the tube when connected, the measurement of current leakage from one end to the other consistently results in a substantial current flow, which may present a risk of shock during re-lamping. Due to this potential shock risk to the person who replaces LLT lamps in an existing fluorescent tube fixture, Underwriters Laboratories (UL) uses its standard, UL 935, Risk of Shock During Relamping (Through Lamp), to do the current leakage test and to determine if LLT lamps under test meet the consumer safety requirement.

Appliances such as toasters and other appliances with exposed heating filaments present the same kind of hazard. When the line and the neutral wire reverse, the heating filaments can remain live even though the power switches to "off". Another example is screw-in incandescent bulbs. With the line and the neutral wire reversed, the screw-in thread of the socket remains energized. These happen when the line and the neutral wires in the wiring behind the walls or in the hookup of sockets are somehow interchanged even with polarized sockets and plugs that are designed for safety. The reason why a consumer can widely use the appliances with heating filaments and screw-in light lamps without worrying about shock hazard is that they have some kinds of protections. The said appliances have protection grids to prevent consumers from touching the heating filaments even when they are cool. The screw-in light lamp receptacle has its two electrical contacts, the line and the neutral in proximity, recessed in the luminaire. When one screws an incandescent bulb in the receptacle, little shock risk exists.

As mentioned, without protection, shock hazard will occur for an LLT lamp, which is at least 2 feet long; it is very difficult for a person to insert the two opposite bi-pins at the two ends of the LLT lamp into the two opposite sockets at two sides of the linear tube lamp fixture at the same time. Because protecting consumers from possible electric shock during re-lamping is a high priority for LLT lamp manufacturers, they need to provide a basic protection design strictly meeting the minimum leakage current requirement and to prevent any possible electric shock that users may encounter in actual usage, no matter how they instruct a consumer to install an LLT lamp in their installation instructions.

Figure 1:
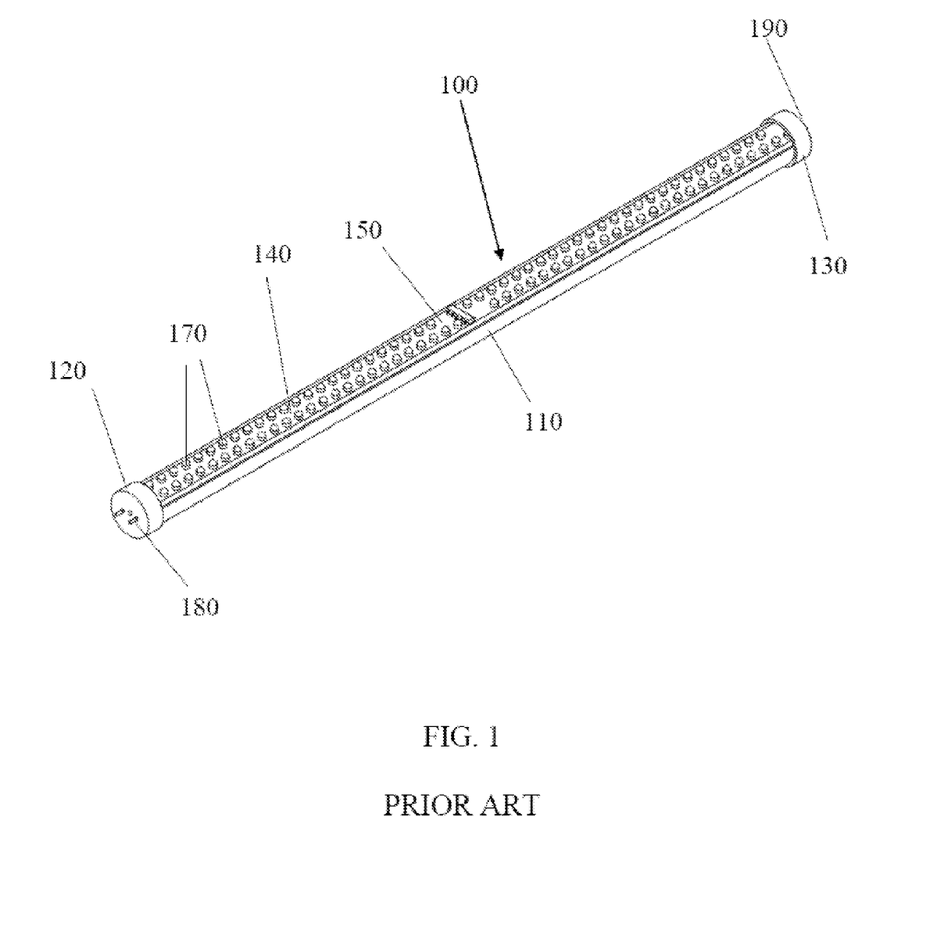
FIG. 1 is an illustration of a conventional LLT lamp.
Figure 2:
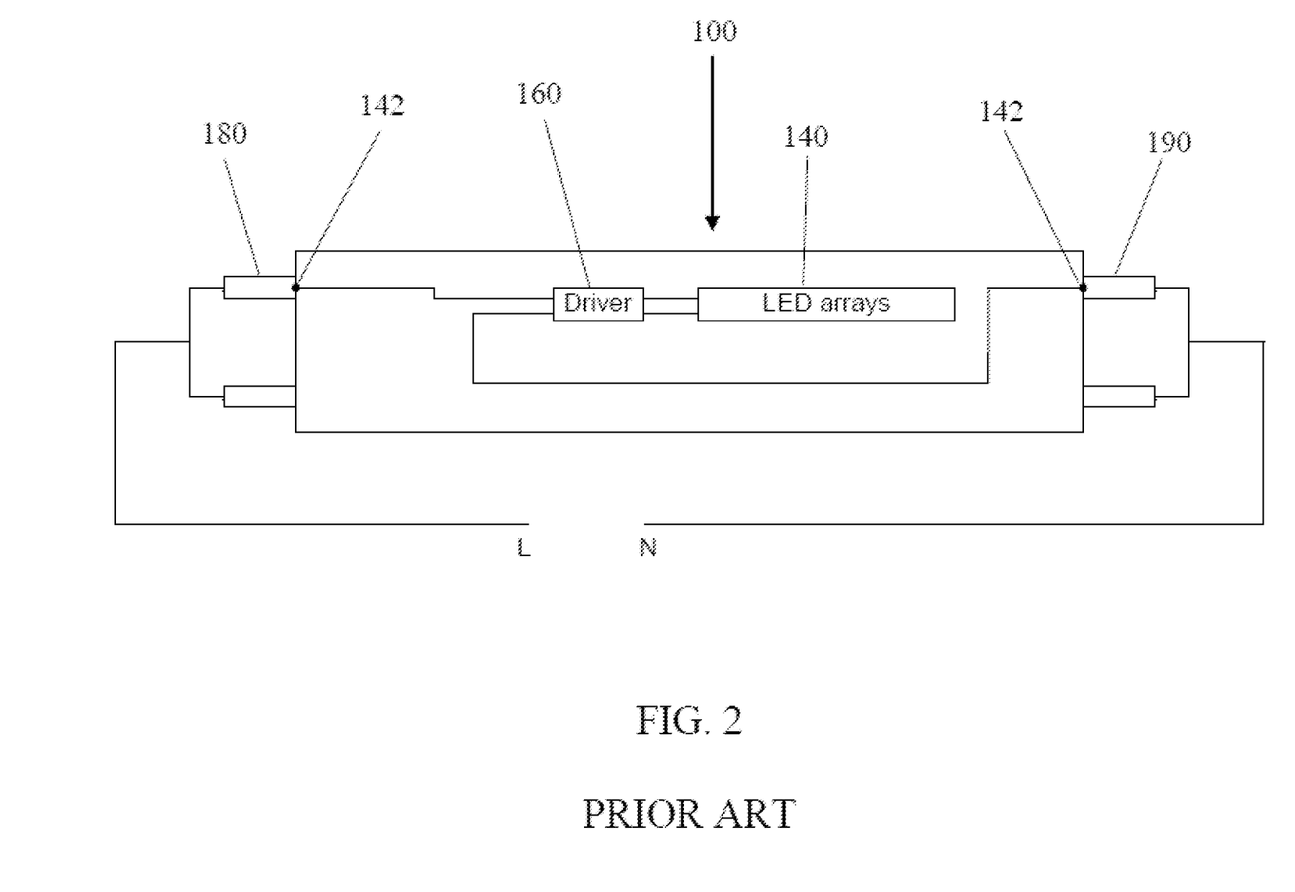
FIG. 2 is a block diagram of a conventional LLT lamp.

Referring to FIGS. 1 and 2, a conventional LLT lamp 100 comprises a housing 110 with a length much greater than its diameter of 25 to 32 mm, two end caps 120 and 130 with bi-pins 180 and 190 respectively on two opposite ends of the housing 110, LED arrays 140 mounted on a printed circuit board (PCB) 150, and an LED driver 160 used to receive energy from the AC mains through electrical contacts 142 and the bi-pins 180 and 190, to generate a proper DC voltage with a proper current, and to supply it to the LED arrays 140 such that the LEDs 170 on the PCB 150 can emit light. The bi-pins 180 and 190 on the two end caps 120 and 130 connect electrically to the AC mains, either 110 V, 220 V, or 277 VAC, through two electrical sockets located lengthways in an existing fluorescent tube fixture whereas the two sockets in the fixture connect electrically to the line and the neutral wire of the AC mains, respectively. This is a so called "double-ended" configuration.

To replace a fluorescent tube with an LLT lamp 100, one inserts the bi-pin 180 at one end of the LLT lamp 100 into one of the two electrical sockets in the fixture and then inserts the other bi-pin 190 at the other end of the LLT lamp 100 into the other electrical socket in the fixture. When the line power of the AC mains applies to the bi-pin 180 through one socket, and the other bi-pin 190 at the other end has not yet been in the other socket in the fixture, the LLT lamp 100 and the LED driver 160 are deactivated because no current flows through the LED driver 160 to the neutral. However, the internal electronic circuitry is live. At this time, if the person who replaces the LLT lamp 100 touches the exposed bi-pin 190, which is energized, he or she will get electric shock because the current flows to earth through his or her body—a shock hazard.

Almost all the LLT lamps currently available on the market are without any protections for such electric shock. The probability of getting shock is 50%, depending on whether the person who replaces the lamp inserts the bi-pin first to the line of the AC mains or not. If he or she inserts the bi-pin 180 or 190 first to the neutral of the AC mains, then the LLT lamp 100 is deactivated while the internal circuitry is not live—no shock hazard. An LLT lamp supplier may want to adopt single protection only at one end of an LLT lamp in an attempt to reduce the risk of shock during re-lamping. However, such a single protection approach cannot completely eliminate the possibility of shock risk. As long as shock risk exists, the consumer product safety remains the most important issue.

An easy solution to reducing the risk of shock is to connect electrically only one of two bi-pins at the two ends of an LLT lamp to the AC mains, leaving the other dummy bi-pin at the other end of the LLT lamp insulated, so called "single-ended". In such a way, the line and the neutral of the AC mains go into the LLT lamp through the single-ended bi-pin, one for "line" (denoted as L, hereafter) and the other for "neutral" (denoted as N, hereafter). The electrically insulated dummy bi-pin at the other end only serves as a lamp holder to support LLT lamp mechanically in the fixture. In this case, however, the retrofit and rewiring of the existing fixture to enable such LLT lamp may involve two new electrical sockets replacement in the fixture and needs much longer time to complete the rewiring because conventional fluorescent tube is double-ended, and its fixture and lamp holder sockets are wired in a double-ended manner. The new sockets, rewiring, and installation costs together will be too high for consumers to replace conventional fluorescent tubes economically. Therefore, some manufacturers have modified the dummy bi-pin by internally connecting the two pins with a conductor. The purpose is to convert a double-ended fixture/wiring into a single-ended configuration so that the single-ended LLT lamp can be used in the double-ended fixture/wiring as shown in FIG. 3, no matter whether the active end of the LLT lamp is on the left or right hand side in the fixture.

Figure 3:
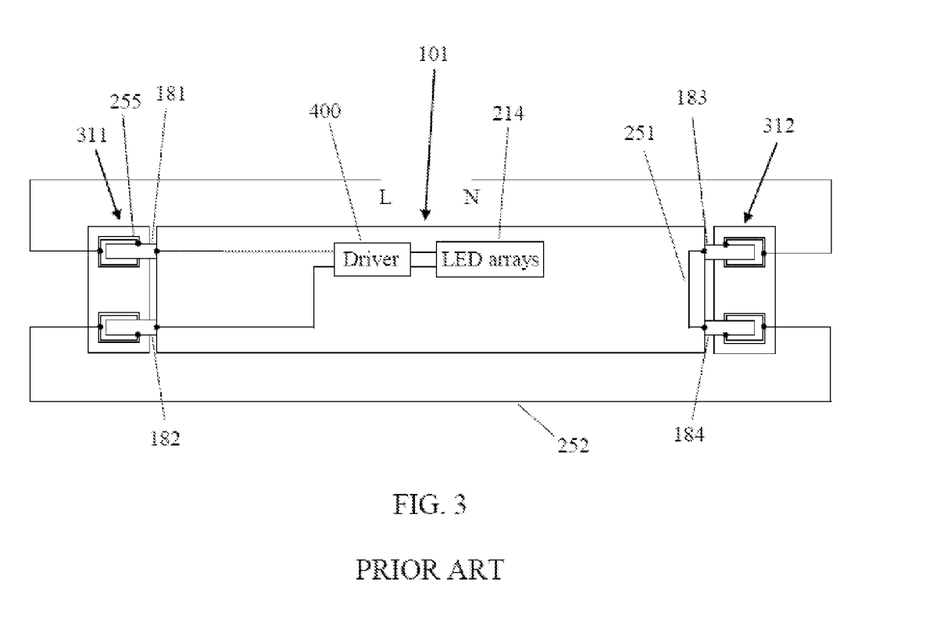
FIG. 3 is an illustration of a single-ended LLT lamp with an electrically shorted end, installed in a double-ended fixture lamp holder.

In FIG. 3, the AC mains supply voltage to the bi-pin sockets in the lamp holder 311 and 312 from two opposite ends of the LLT lamp 101—a double-ended configuration. However, LLT lamp 101 is internally connected as single ended because two pins 181 and 182 of the bi-pin are at one end, from which the LED driver 400 receives energy to power LED arrays 214. The conductors 255 in the sockets of the lamp holder 311 and 312 are used to connect the bi-pins to the AC mains through electrical contacts shown as dots. The "dot" notation will be used to indicate electrical contacts throughout the figures. In order to receive energy from both ends of a double-ended fixture so that such a single-ended LLT lamp can operate in the double-ended fixture, manufacturers interconnect the two pins 183 and 184 of the bi-pin at one end with a conductor 251 inside the lamp such that electric current can flow through the pin 183, the conductor 251, the pin 184, and an electrical wire 252 to the pin 182 at the other end. The modification seems to work to operate the LLT lamp in the double-ended fixture and be able to pass UL leakage current test. But this introduces shock and fire hazards. Imagine what will happen if consumers insert this electrically shorted end to a real single-ended fixture that has L and N connections on the bi-pin socket. This definitely will burn the connections on the bi-pin, possibly causing fire, and trip the circuit breaker. Due to this potential shock and fire risk for this kind of LLT lamp modification used with an existing fluorescent tube fixture, UL requires that the lamp base bi-pin used for mechanical support only not be interconnected or connected to dead metal parts of the lamp base. Furthermore, such single-ended LLT lamps are subjected to the requirements in UL Isolation of Lamp Pins test, ensuring no indication of fire or risk of electric shock if manufacturers want their products to be UL certified.

Figure 4:
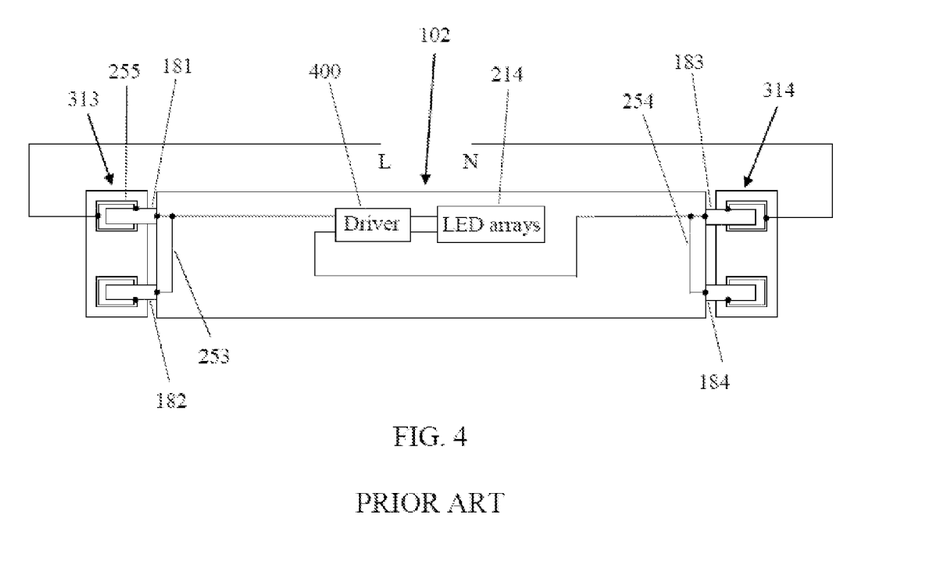
FIG. 4 is an illustration of a double-ended LLT lamp with two electrically shorted ends, installed in a double-ended fixture lamp holder.

Similar hazards occur for double-ended lamps. There are many double-ended lamps without shock-protection mechanisms on the linear LED lighting market. Such lamps will never pass UL leakage current test and present the shock risk during re-lamping, as mentioned above. In addition, such non-UL compliant LLT lamps have their bi-pins internally connected. In FIG. 4, the LED driver 400 receives energy from both bi-pin sockets in the lamp holders 313 and 314 at opposite ends of the LLT lamp 102 to power LED arrays 214—a double-ended configuration. The two pins 181 and 182 at one end are internally interconnected with a conductor 253. Similarly, the two pins 183 and 184 at the other end are internally interconnected with a conductor 254. In this case, as long as either one electrical contact in the bi-pin sockets has a power, the LLT lamps can operate. Manufacturers do this modification just trying to make it easy for consumers to more easily retrofit their linear tube lamp fixtures without considering that the same hazards as mentioned for the single-ended LLT lamps may occur if either one of such bi-pins is inserted into a powered socket in a single-ended fixture with single-ended wiring. Furthermore, because LLT lamps have a very long service life, consumers who do not know single-ended and double-ended configurations may try to install their LLT lamps in another fixture with unknown wiring configuration several years later while original installation/wiring instructions may not be found. In this case, there exist fire and shock hazards.

Figure 5:
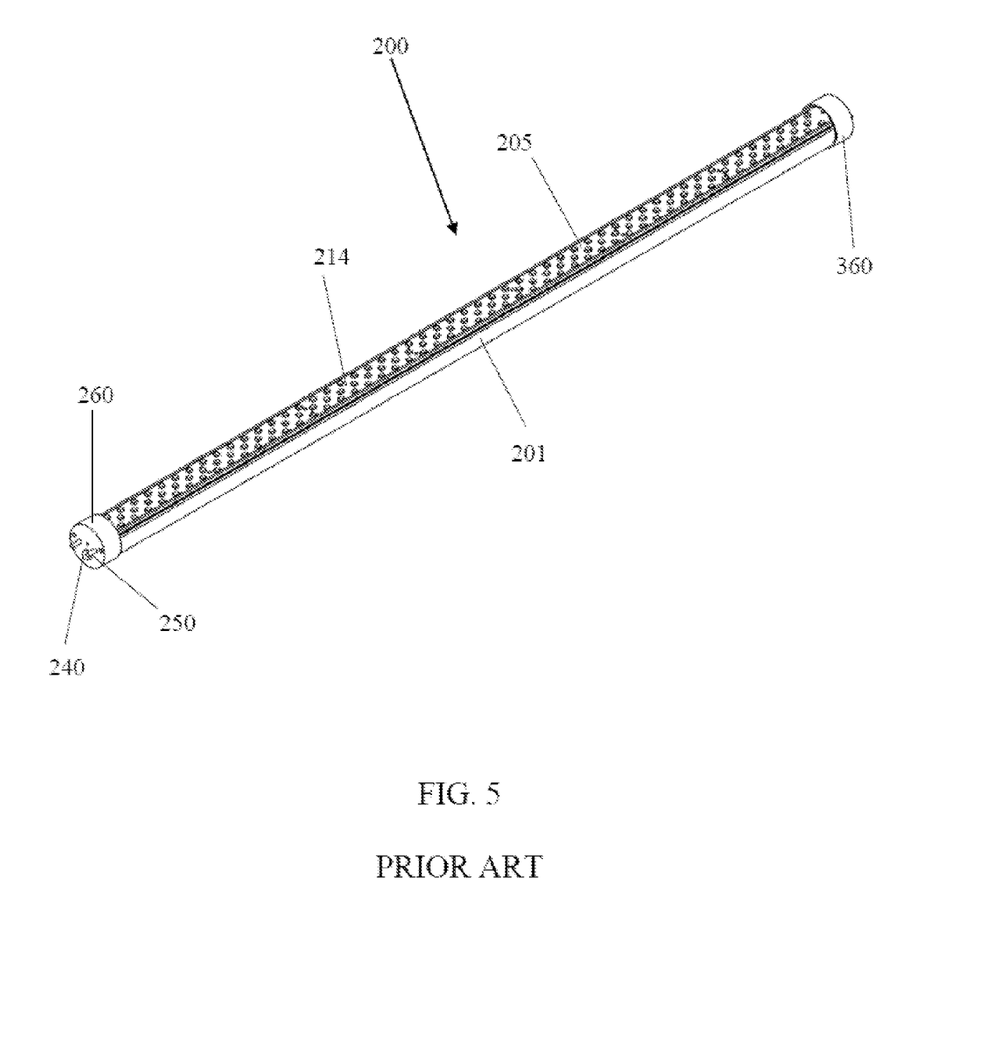
FIG. 5 is an illustration of an LLT lamp with shock protection switches.
Figure 6:
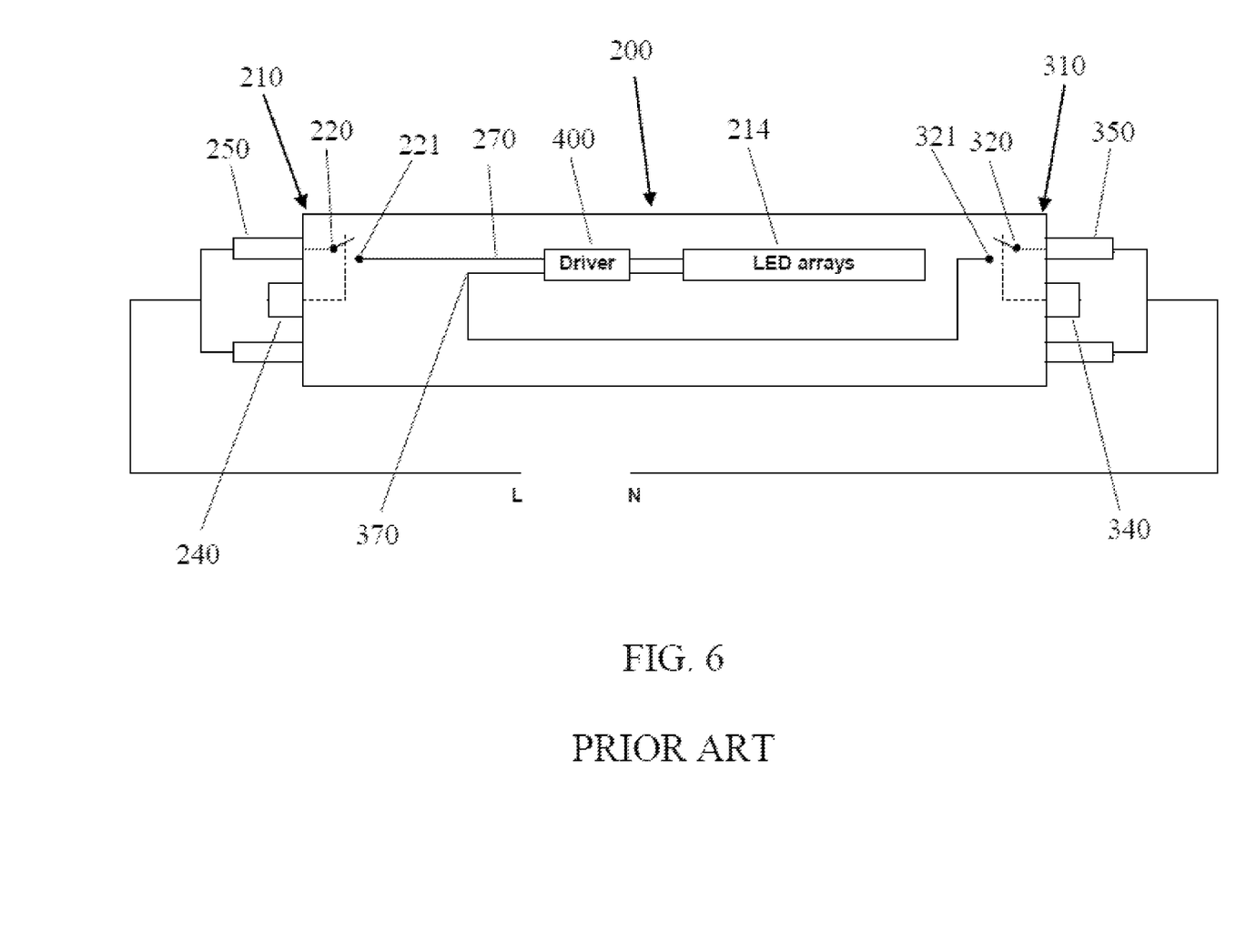
FIG. 6 is a block diagram of an LLT lamp with shock protection switches.

In the U.S. Pat. No. 8,147,091, issued Apr. 3, 2012, double shock protection switches are used in a double-ended LLT lamp to isolate its LED driver such that a leakage current flowing from a live bi-pin, through the LED driver, to an exposed bi-pin is eliminated without hazards. FIGS. 5 and 6 illustrate an LLT lamp with such shock protection switches. The LLT lamp 200 has a housing 201; two lamp bases 260 and 360, one at each end of the housing 201; two actuation mechanisms 240 and 340 of shock protection switches 210 and 310 in the two lamp bases 260 and 360, respectively; an LED driver 400; and LED arrays 214 on an LED PCB 205.

FIG. 6 is a block diagram of an LLT lamp 200 with the protection switches 210 and 310. The shock protection switch 210 comprises two electrical contacts 220 and 221 and one actuation mechanism 240. Similarly, a shock protection switch 310 comprises two electrical contacts 320 and 321 and one actuation mechanism 340. The electrical contact 220 in the protection switch 210 connects electrically to the bi-pin 250 that connects to the L wire of the AC mains, and the other contact 221 connects to one of the inputs 270 of the LED driver 400. Similarly, the electrical contact 320 in the protection switch 310 connects electrically to the bi-pin 350 that connects to the N wire of the AC mains, and the other contact 321 connects to the other input 370 of the LED driver 400. The switch is normally off. Only after actuated, will the switches turn "on" such that they connect the AC mains to the LED driver 400 that in turn powers the LED arrays 214. Served as gate controllers between the AC mains and the LED driver 400, the protection switches 210 and 310 connect the line and the neutral of the AC mains to the two inputs 270 and 370 of the LED driver 400, respectively. If only one shock protection switch 210 is used at one lamp base 260, and if the bi-pin 250 of this end happens to be first inserted into the live socket at one end of the fixture, then a shock hazard occurs because the shock protection switch 210 already allows the AC power to electrically connect to the LED driver 400 inside the LLT lamp when the bi-pin 250 is in the socket. Although the LLT lamp 200 is deactivated at the time, the LED driver 400 is live. Without the shock protection switch 310 at the other end of the LLT lamp 200, the LED driver input 370 connects directly to the bi-pin 350 at the other end of the LLT lamp 200. This presents a shock hazard. However, if the shock protection switch 310 is used in accordance with this application, the current flow to the earth continues to be interrupted until the bi-pin 350 is inserted into the other socket, and the protection switch 310 is actuated. The switch redundancy eliminates the possibility of shock hazard for a person who installs an LLT lamp in the existing fluorescent tube fixture.

Double shock protection switches used in a double-ended LLT lamp can be used to isolate its LED driver such that a leakage current flowing from a live bi-pin, through the LED driver, to an exposed bi-pin is eliminated without hazards. However, such lamps are non-operable because no power supplies to the LED driver when used with single-ended fixtures. Even worse, when the two adjacent pins of the bi-pin on either one of the two ends in the double-ended LLT lamp are abnormally interconnected, the lamps may present a fire hazard when installed in the single-ended fixture, as mentioned above. In the present invention, however, double shock protection switches are used in a universal single-ended or double-ended LLT lamp to isolate its degenerate voltage sensing and control mechanism such that the leakage current flowing from a live bi-pin, through the degenerate voltage sensing and control mechanism and an LED driver, to an exposed bi-pin is interrupted without hazards.

SUMMARY

A linear light-emitting diode (LED)-based solid-state universal lamp comprising a housing, an LED driver, an LED printed circuit board (PCB) with a plurality of LEDs as LED arrays, a lens, a degenerate voltage sensing and control mechanism, and a shock protection mechanism, is used to replace a fluorescent tube in a retrofit or newly-made linear tube lamp fixture that could be single-ended or double-ended. The degenerate voltage sensing and control mechanism in such a universal linear LED tube (LLT) lamp can detect power source configurations in the fixture and make proper and necessary management so that the universal LLT lamp can operate with either single-ended or double-ended wiring fixtures without operational uncertainty or risk of fire associated with the lamp misapplications. Such a configuration when used with shock protection switches on both ends of the universal LLT lamp can effectively block an electric current flow from the AC mains, through the degenerate voltage sensing and control mechanism and the LED driver used to power LED arrays. Therefore, no line voltage or leakage current will possibly appear at or flow through an exposed bi-pin during initial installation or re-lamping, thus completely eliminating risks of fire and electric shocks.

The degenerate voltage sensing and control mechanism comprises two degenerate voltage sensing and control devices respectively connecting to two bi-pins associated with two ends of the universal LLT lamp that is installed in a linear tube lamp fixture configured as single-ended or double-ended. The degenerate voltage sensing and control devices detect an AC voltage existed and control electric current paths to deliver the power to the LED driver. In this scheme, the electric current paths are reconfigurable according to single-ended or double-ended wiring configurations of the linear tube lamp fixture used.

With such an invention implemented in the universal LLT lamp, consumers can safely install the universal LLT lamp in any linear tube lamp fixtures without worrying about possible fire and electric shock hazards that may occur due to misapplications or wiring incompatibility between a linear tube lamp fixture and a conventional LLT lamp. Furthermore, because the two degenerate voltage sensing and control devices are connected in parallel and in symmetry about the two ends of the LLT lamp, the lamp according to present invention is 100% operational, no need to try the other end to operate as a conventional single-ended LLT lamp does when it happens to be installed in a non-power end of the linear tube lamp fixture.

The claims and advantages will be more readily appreciated as the inventive concept becomes better understood by reference to the following detailed description and the accompanying drawings showing exemplary embodiments, in which like reference symbols designate like parts. For clarity, various parts of the embodiments in the drawings are not drawn to scale.

BRIEF DESCRIPTION OF THE DRAWINGS

The accompanying drawings are included to aid further understanding of the present disclosure, and are incorporated in and constitute a part of the present disclosure. The drawings illustrate a select number of embodiments of the present disclosure and, together with the detailed description below, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Misapplications of power supply connections for conventional LLT lamps that substitute for linear fluorescent lamps are the main causes of fire and electric shock hazards today, where the conventional LLT lamps are incorrectly connected to a supply source, the lamp base is either inserted incorrectly into a lamp holder or inserted into a lamp holder not intended for the conventional LLT lamp, or a conventional LLT lamp is connected to lamp holders with supply connections that do not match the lamp configuration. All of these misapplications may result in fire and shock hazards.

To completely remove these hazards from conventional LLT lamps, manufacturers need to ensure at first no electrically shorted ends in either single-ended or double-ended LLT lamps. For double-ended LLT lamps, double protection switches on both ends of the LLT lamps must be used without compromise. For single-ended LLT lamps, consumers may find them difficult to use because there is a chance that the LLT lamps cannot be lighted up after installation due to the fact that the lamp may be connected to a lamp holder that does not have supply connections. In this case, the consumers need to uninstall the lamp and reinstall it with the end exchanged to see if the lamp is operational. Whereas a linear tube lamp fixture may be wired single- or double-ended, a linear lamp may be configured internally in the similar fashion. However, any incompatible combinations of the conventional LLT lamps and the fixtures lead to failure of operation. These kinds of operational uncertainty, inconvenience, and possible hazards may severely affect the willingness of the consumers to adopt conventional LLT lamps.

For consumer safety and convenience, it is believed that a universal LLT is needed to operate without operational uncertainty and hazards when installed in either single-ended or double-ended linear tube lamp fixtures during initial installation for a retrofit luminaire conversion or during lamp replacement when the above-mentioned misapplications may occur. From a manufacturer's perspective, a universal LLT lamp is essential not only in protecting consumers but also in helping simplify manufacturing processes and inventories.

In the present invention, a degenerate voltage sensing and control mechanism and double shock protection switches are incorporated into a universal LLT lamp that can work with single-ended or double-ended linear tube lamp fixtures. Moreover, because leakage current flowing from a live bi-pin, through the LED driver, to an exposed bi-pin is interrupted by the double shock protection switches, the universal LLT lamp is fire and shock hazard-free. This is different from the conventional LLT lamp adopted in the U.S. Pat. No. 8,147,091, which can only be used in double-ended fixtures. Furthermore, although the universal LLT lamp used in the present invention has a similar appearance even on switch actuation mechanisms that protrude the end caps, the switches used inside the universal LLT lamps are different from those inside the conventional LLT lamps, as will be explained in detail hereafter.

Figure 7:
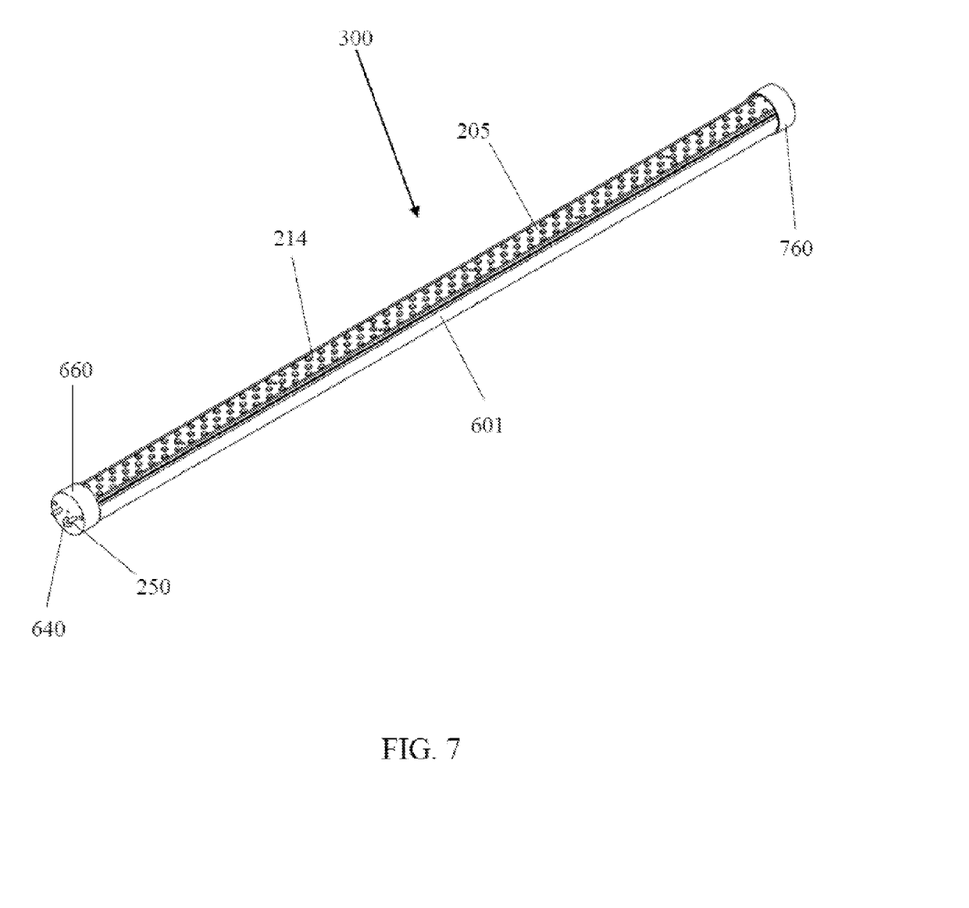
FIG. 7 is an illustration of a universal LLT lamp adopting shock protection switches and a degenerate voltage sensing and control mechanism inside the lamp according to the present invention.
Figure 8:
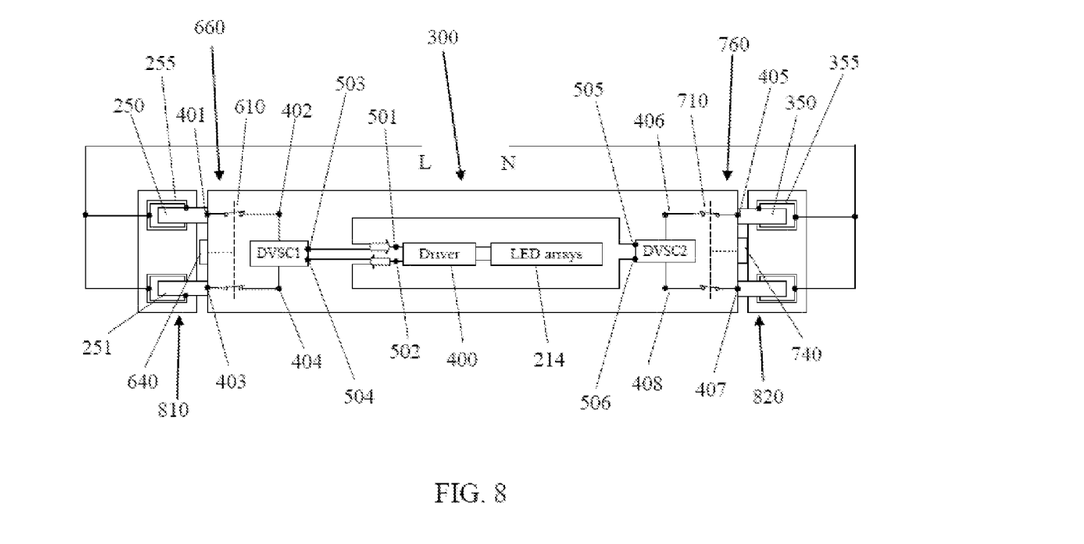
FIG. 8 is a block diagram of a universal LLT lamp according to the present invention, in which the lamp is installed in a double-ended fixture lamp holder.
Figure 9:
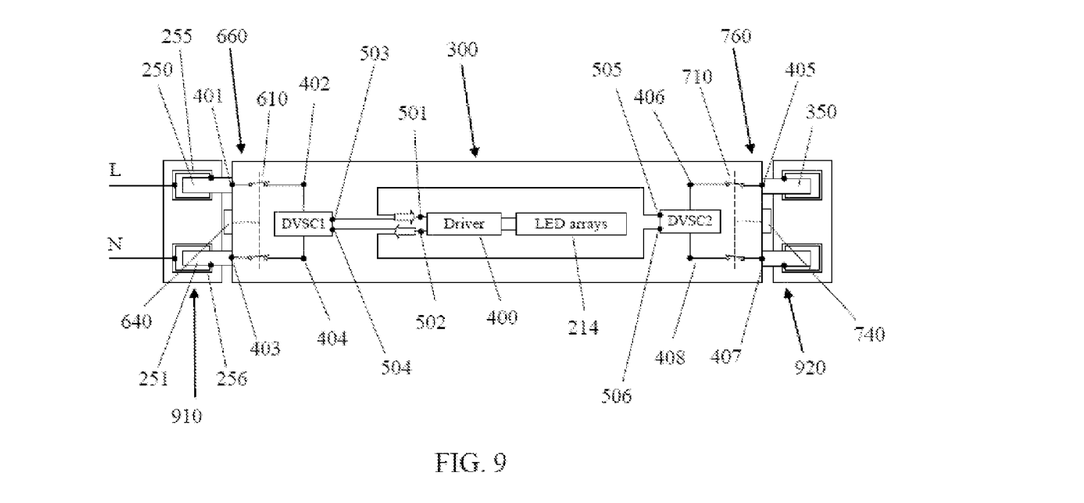
FIG. 9 is a block diagram of a universal LLT lamp according to the present invention, in which the lamp is installed in a single-ended fixture lamp holder.

FIGS. 7-9 illustrate a universal LLT lamp according to the present invention. The universal LLT lamp 300 comprises a housing 601 having two ends; two lamp bases 660 and 760, one at each end of the housing 601; two actuation mechanisms 640 and 740 of shock protection switches 610 and 710 in the two lamp bases 660 and 760, respectively; a degenerate voltage sensing and control mechanism comprising two degenerate voltage sensing and control devices DVSC1 and DVSC2; an LED driver 400 having two inputs; and LED arrays 214 on an LED PCB 205. The first degenerate voltage sensing and control device DVSC1 comprises input/output ports (402, 404, 503, 504) whereas the second degenerate voltage sensing and control device DVSC2 comprises input/output ports (406, 408, 505, 506). DVSC1 and DVSC2 are connected to the LED driver 400 in parallel through the two inputs 501 and 502 of the LED driver 400 and are symmetric at the two ends of the universal LLT lamp. The protection switch 610 at the lamp base 660 is of double-pole single-throw type, which consists of one actuation mechanism 640 and two sets of electrical contacts. In the first set, the first electrical contact connects to the bi-pin 250 at an electrical contact 401 whereas the second electrical contact connects to the input/output port 402 of DVSC1. In the second set, the first electrical contact connects to the bi-pin 251 at an electrical contact 403 whereas the second electrical contact connects to the input/output port 404 of DVSC1. Similarly, the shock protection switch 710 at the other lamp base 760 comprises one actuation mechanism 740 and two sets of electrical contacts with electrical contacts 405 and 407 respectively connecting to the two pins of bi-pin 350 and the input/output ports 406 and 408 of DVSC2, as shown in FIGS. 8 and 9. FIG. 8 is a block diagram of the universal LLT lamp according to the present invention, in which the universal LLT lamp is installed in a double-ended fixture lamp holder. The lamp bases 660 and 760 respectively use the bi-pins 250 and 350 to connect the AC mains to the LED driver 400 through the protection switches 610 and 710 normally in "off" state and the degenerate voltage sensing and the control devices DVSC1 and DVSC2. When actuated (pressed in, twisted on, etc.), the actuation mechanisms 640 and 740 respectively actuate the protection switches 610 and 710 and turn on the connection between the AC mains and the degenerate voltage sensing and control devices DVSC1 and DVSC2, wherein DVSC1 and DVSC2 are electrically connected to the bi-pins 250 and 350 in the lamp bases 660 and 760, respectively. In FIG. 8, the fixture lamp holder sockets are connected as a double-ended configuration, "L" and "N" of the AC mains connecting to the sockets 255 and 355 of the fixture lamp holders 810 and 820, respectively.

When someone tries to install the universal LLT lamp 300 in a double-ended fixture as in FIG. 8, she or he needs to first insert, for example, the lamp base 660 to the fixture lamp holder 810. The actuation mechanism 640 is actuated to turn on both sets of electrical contacts on the shock protection switch 610. The degenerate voltage sensing and control device DVSC1 senses whether a voltage exists between the input/output ports 402 and 404. Because the fixture lamp holder sockets are connected in a double-ended manner, the input/output ports 402 and 404 have the same electrical potential, and no AC power is sent to the LED driver 400, and thus no power is delivered to the LED arrays 214. At this time, because the lamp base 760 has not yet been inserted into the lamp holder 820, the actuation mechanism 740 is not actuated. So the shock protection switch 710 remains "off", disconnecting any electric current flow to the exposed bi-pin 350, and thus no leakage current can possibly flow out—no shock hazard. When the person who does the installation further inserts the lamp base 760 into the lamp holder 820, the actuation mechanism 740 is actuated, which turns on the protection switch 710, thus connecting the bi-pin 350 to the input/output ports 406 and 408. Again, the degenerate voltage sensing and control device DVSC2 senses no voltage between the input/output ports 406 and 408 and sends no AC power to the LED driver 400. However, when the protection switch 710 is "on", an electric potential difference exists between the input/output ports 402 and 406. In this case, an electric current can flow from the input/output port 503 of the degenerate voltage sensing and control device DVSC1, through the first input 501 of the LED driver 400, to the LED driver 400, followed by a return path from the LED driver 400, through the second input 502 of the LED driver 400, the input/output port 506 of the degenerate voltage sensing and control device DVSC2, and the input/output ports 406 and 408 to the bi-pin 350, thus delivering AC power to the LED driver 400, which then powers and lights up the LED arrays 214.

FIG. 9 is a block diagram of an LLT lamp according to the present invention, in which the universal LLT lamp is installed in a single-ended fixture sockets. When someone tries to install the universal LLT lamp 300 in the single-ended fixture, she or he first inserts, for example, the lamp base 660 to the fixture lamp holder 910. As mentioned, the actuation mechanism 640 is actuated to turn on both sets of electrical contacts on the shock protection switch 610. The degenerate voltage sensing and control device DVSC1 senses whether a voltage exists between the input/output ports 402 and 404. Because the sockets 255 and 256 in the fixture lamp holder 910 are connected to the AC mains, the degenerate voltage sensing and control device DVSC1 senses that an AC voltage exists between the input/output ports 402 and 404, and delivers a power from "L" of the AC mains to the LED driver 400 through the input/output port 402, the input/output port 503 of the degenerate voltage sensing and control device DVSC1, the first input 501 of the LED driver 400, to the LED driver 400, returned from the LED driver 400, the second input 502 of the LED driver 400, the input/output port 504 of the degenerate voltage sensing and control device DVSC1, and the input/output port 404 to "N" of the AC mains, which then powers and lights up the LED arrays 214. On the other hand, if the sockets of the fixture lamp holder 920 rather than the lamp holder 910 are connected to the AC mains, no voltage exists between the input/output ports 402 and 404, and thus no power is delivered to the LED driver 400. When the person who does the installation further inserts the lamp base 760 into the lamp holder 920, the actuation mechanism 740 is actuated, which turns on the protection switch 710, thus connecting the bi-pin 350 to the input/output ports 406 and 408. In this case, the degenerate voltage sensing and control device DVSC2 senses the AC voltage between the input/output ports 406 and 408, and delivers a power from the AC mains to the LED driver 400 through its first and second inputs 501 and 502, which then powers and lights up the LED arrays 214. However, if no switch 710 is in place as shown in FIG. 9, an electric current flow from the LED driver 400 can reach the input/output port 506 of the degenerate voltage sensing and control device DVSC2 so that a voltage will appear between the bi-pin 350 and ground—an electric shock hazard if the bi-pin 350. is not in the sockets in the lamp base 920. Therefore, the degenerate voltage sensing and control devices DVSC1 and DVSC2 and the shock protection mechanism adopted in this universal LLT lamp can work with either single-ended or double-ended fixtures free of operational uncertainty and fire and shock hazards due to lamp misapplications, as mentioned in background of invention section.

For illustration purpose, the shock protection switches 610 and 710 are both of contact type, which can be a snap switch, a push-button switch, a micro switch, a twist-on switch, a rotary switch, or any home-made switches that perform switch functions. In reality, the shock protection switch can be of a non-contact type, such as electro-mechanical, electro-magnetic, optical, electro-optic, fiber-optic, infrared, or wireless based. Furthermore, the non-contact shock protection switch can be of a sensing type, having a proximity control with a sensing range up to 8 mm.

Figure 10:
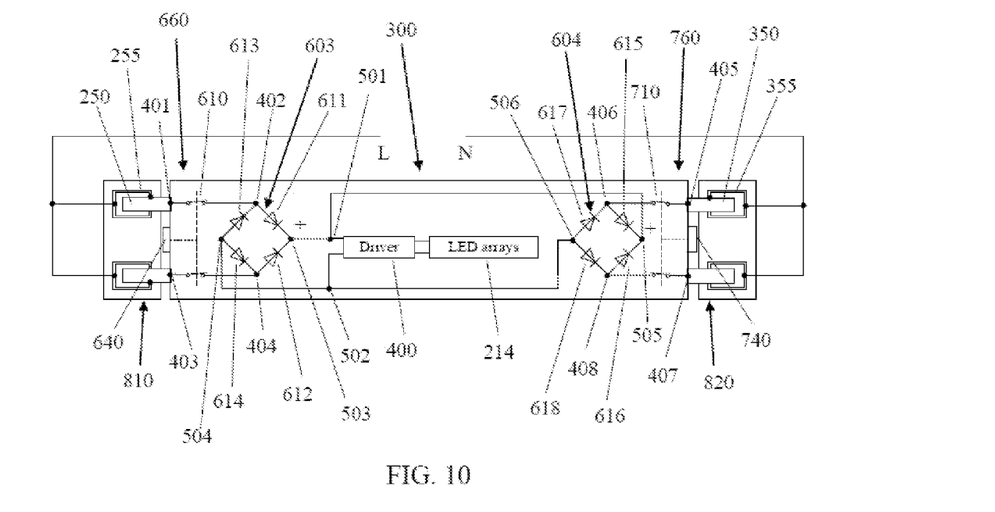
FIG. 10 is a preferred embodiment according to the present invention, in which the universal LLT lamp is installed in a double-ended fixture lamp holder.
Figure 11:
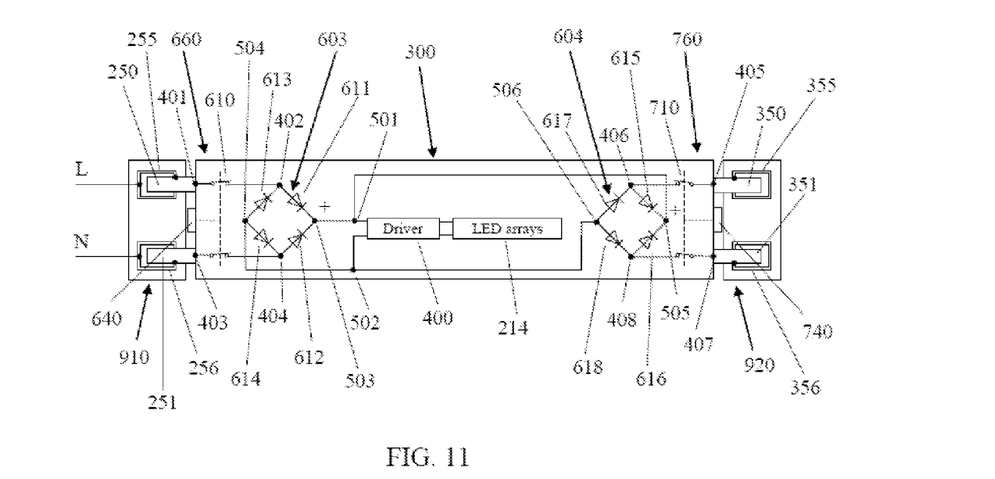
FIG. 11 is a preferred embodiment according to the present invention, in which the universal LLT lamp is installed in a single-ended fixture lamp holder.

FIGS. 10 and 11 respectively depict two preferred embodiments of two degenerate voltage sensing and control devices with shock protection switches according to the present invention, in which the universal LLT lamp is respectively installed in double-ended and single-ended fixture lamp holders. Essentially the degenerate voltage sensing and control devices DVSC1 and VDVSC2 (in FIG. 8 and FIG. 9) are embodied in two bridge rectifiers 603 and 604, wherein each bridge rectifier comprises four diodes, 611, 612, 613, and 614 for the first bridge rectifier 603 and 615, 616, 617, and 618 for the second bridge rectifier 604. In the first bridge rectifier 603, the four diodes are interconnected with four input/output ports 402, 404, 503, and 504. Similarly, in the second bridge rectifier 604, the four diodes are interconnected with four input/output ports 406, 408, 505, and 506. The two bridge rectifiers 603 and 604 are connected to the LED driver 400 in parallel such that the positive and the negative input/output ports 503 and 504 of the first bridge rectifier 603 respectively connect to the positive and the negative input/output ports 505 and 506 of the second bridge rectifier 604. Furthermore, the eight diodes in the two bridge rectifiers are partially paired to perform a full-wave rectification of an AC voltage from the AC mains according to single-ended or double-ended wiring configuration in the linear tube lamp fixture.

A diode conducts an electric current if they are forward biased but blocks a current flow if they are reversed biased. Taking advantage of this property, each diode in the bridge rectifiers 603 and 604 can sense an electric potential difference between its two ports and convert AC to DC if an AC voltage is applied to a circuit with a diode connected in a proper manner. With the eight diodes configured in the present invention, the two bridge rectifiers can control the electric current flows to the LED driver and the electric current return, thus delivering a power to the LED driver.

In FIG. 10, when the lamp bases 660 and 760 are respectively installed in the fixture lamp holders 810 and 820, the actuation mechanisms 640 and 740 are actuated to turn on both sets of electrical contacts on the shock protection switches 610 and 710. The diodes 611 and 612 in the bridge rectifier 603 detect an electric current path and conduct a positive cycle of an electric current from the socket 255 of the fixture lamp holder 810 (where L of the AC mains is designated), the input/output ports 402 and 404, the diodes 611 and 612, the input/output port 503, the first input 501 of the LED driver 400 to the LED driver 400, returned from the LED driver 400, through the second input 502 of the LED driver 400, the input/output port 506, and the diodes 617 and 618 to N, thus delivering a power to the LED driver 400. In this electric current path, the diodes 611 and 612, 617, and 618 are forward biased whereas the diodes 613, 614, 615, and 616 are reversed biased, so the electric current can go through a correct path from L to N of the AC mains. Similarly for a negative cycle except that the diodes 613, 614, 615, and 616 are forward biased whereas the diodes 611, 612, 617, and 618 are reversed biased, an electric current can start from the fixture lamp holder 820, the diodes 615 and 616, the input/output port 505, the first input 501 of the LED driver 400 to the LED driver 400, returned from the LED driver 400, through the second input 502 of the LED driver 400, the input/output port 504, the diodes 613 and 614 to the fixture lamp holder 810, thus delivering a power to the LED driver 400. In FIG. 10, any electric current will not leak out from the exposed bi-pins because once, for example, the lamp base 660 is out of the socket of the lamp holder 810, the actuation mechanism 640 will be deactivated, which turns off the switch 610, and thus disconnecting the electric current—no electric shock hazard. Similarly for the lamp base 760, when the lamp base 760 is out of the socket of the lamp holder 820, the actuation mechanism 740 is deactivated, turning off the switch 710, and thus disconnecting the electric current from flowing out to electrically shock an installer.

In FIG. 11, the universal LLT lamp 300 is installed in a single-ended fixture in such a way that the lamp bases 660 and 760 respectively connect to the fixture lamp holders 910 and 920, which L and N of the AC mains are respectively connected to. The actuation mechanisms 640 and 740 are actuated to turn on both sets of electrical contacts on the shock protection switches 610 and 710. The diodes 611 and 612 in the bridge rectifier 603 detect an electric current path and conduct a positive cycle of an electric current from the socket 255 (where L of the AC mains is designated) in the fixture lamp holder 910, the electrical contact 401, the input/output port 402, the diode 611, the input/output port 503, the first input 501 of the LED driver 400 to the LED driver 400, returned from the LED driver 400, through the second input 502 of the LED driver 400, the input/output port 504, the diode 614, the input/output port 404, and the electrical contact 403, to the socket 256 (where N of the AC mains is designated) in the fixture lamp holder 910, thus delivering a power to the LED driver 400. In this case, the diodes 611 and 614 are forward biased whereas the diodes 612 and 613 are reversed biased, so the electric current can go through a correct path from L to N of the AC mains. Similarly for a negative cycle except that the diodes 612 and 613 are forward biased whereas the diodes 611 and 614 are reversed biased, an electric current can start from the socket 256 in the fixture lamp holder 910, the electrical contact 403, input/output port 404, the diode 612, the input/output port 503, the first input 501 of the LED driver 400 to the LED driver 400, returned from the LED driver 400, through the second input 502 of the LED driver 400, the input/output port 504, the diode 613, the input/output port 402, and the electrical contact 401, to the socket 255 in the fixture lamp holder 910, thus delivering the negative cycle of the power to the LED driver 400.

When the lamp base 660 of the universal LLT lamp 300 is first inserted into the sockets 255 and 256 of the fixture lamp holder 910, the LED driver 400 immediately obtains a power via the bridge rectifier 603 no matter whether the lamp base 760 has been installed in the fixture lamp holder 920 or not. However, the electric current returned from the LED driver 400 can flow from the input/output port 506, the diodes 617 and 618 in the bridge rectifier 604 to the bi-pins 350 and 351 in the lamp base 760 if no switch 710 is along the path in between the input/output ports 406 and 408 and the bi-pins 350 and 351, creating an electric shock hazard if an installer touches the bi-pins 350 or 351. Therefore, only when the lamp base 760 is installed in the fixture lamp holder 920, is the actuation mechanism actuated to turn on the switch 710, thus protecting the installer from the electric shock. Although "L" and "N" are connected to the lamp base 660 in FIG. 11, the universal LLT lamp 300 can still operate when the AC mains connect to the lamp base 760 rather than the lamp base 660 because the two bridge rectifiers 603 and 604 are connected to the LED driver 400 in parallel through the two inputs 501 and 502 of the LED driver 400, and the two bridge rectifiers 603 and 604 are symmetric at the two ends of the universal LLT lamp. Similarly for double-ended linear fixtures, when "L" and "N" shown in FIGS. 8 and 10 are exchanged, the universal LLT lamp can still operate. The embodiments depicted in FIGS. 10 and 11 have an advantage of being simple and also passive without pre-power to operate. Thus, it is easy to implement.

Although the above embodiment uses two bridge rectifiers comprising eight diodes to implement two degenerate voltage sensing and the control devices, the degenerate voltage sensing and the control devices can be of non-diode type, implemented by an application-specific integrated circuit (ASIC), a field-programmable gate array (FPGA), or a microcontroller.

Whereas preferred embodiments of the invention have been shown and described, it will be realized that alterations, modifications, and improvements may be made thereto without departing from the scope of the following claims. Another voltage sensing and control mechanism in an LED linear tube lamp using various kinds of combinations to accomplish the same or different objectives could be easily adapted for use from the present invention. Accordingly, the foregoing description and attached drawings are by way of example only, and are not intended to be limiting.

ADDITIONAL AND ALTERNATIVE IMPLEMENTATION NOTES

Although the techniques have been described in language specific to certain applications, it is to be understood that the appended claims are not necessarily limited to the specific features or applications described herein. Rather, the specific features and examples are disclosed as non-limiting exemplary forms of implementing such techniques.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

For the purposes of this disclosure and the claims that follow, the terms "coupled" and "connected" may have been used to describe how various elements interface. Such described interfacing of various elements may be either direct or indirect.

What is claimed is:

1. A linear light-emitting diode (LED) tube lamp, comprising:
    a housing having two ends;
    a light-emitting diode printed circuit board (LED PCB), the LED PCB having LED arrays fixed thereon;
    an LED driver configured to power the LED arrays on the LED PCB, the LED driver having two inputs;
    a degenerate voltage sensing and control mechanism comprising two degenerate voltage sensing devices electrically connected to the LED driver in parallel, each degenerate voltage sensing device having four input/output ports; and
    two lamp bases respectively connected to the two ends of the housing, each lamp base having a bi-pin and a shock protection switch, the bi-in including two pins protruding outwards, wherein:
        when the shock protection switch is off, the bi-pin is not electrically connected with any one of the degenerate voltage sensing and control devices; and
        when the bi-pin is installed in a lamp socket, the shock protection switch is actuated to electrically connect the two pins of the bi-pin respectively with two of the input/output ports of a respective one of the degenerate voltage sensing and control devices.

2. The linear LED tube lamp of claim 1, wherein the shock protection switch of each of the lamp bases comprises:
    two sets of electrical contacts, each set having at least two electrical contacts with one electrically connected to one of the two pins of the bi-pin and another electrically connected to one of the input/output ports of the degenerate voltage sensing and control device; and
    at least one switch actuation mechanism having a front portion protruding outwards,
    wherein when the front portion of the switch actuation mechanism is pressed in or twisted on as the bi-pin of the lamp base is installed in a lamp socket, the electrical contacts of each of the two sets of electrical contacts are electrically connected to actuate the shock protection switch.

3. The linear LED tube lamp of claim 1, wherein each of the two degenerate voltage sensing and control devices comprises a bridge rectifier, each bridge rectifier comprising diodes interconnected with the respective four input/output ports, wherein the diodes in the two bridge rectifiers are partially paired to perform a full-wave rectification of an AC voltage from an AC mains.

4. The linear LED tube lamp of claim 1, wherein the degenerate voltage sensing and control devices are of a non-diode type, implemented by an application-specific integrated circuit (ASIC), a field-programmable gate array (FPGA), or a microcontroller.

5. The linear LED tube lamp of claim 1, wherein each of the shock protection switches is of a contact type.

6. The linear LED tube lamp of claim 5, wherein each of the shock protection switches is a snap switch, a push-button switch, a micro switch, a twist-on switch, or a rotary switch.

7. The linear LED tube lamp of claim 1, wherein each of the shock protection switches is of a non-contact type.

8. The linear LED tube lamp of claim 7, wherein each of the shock protection switches is electro-mechanical, electromagnetic, optical, electro-optic, fiber-optic, infrared, or wireless based.

9. The linear LED tube lamp of claim 8, wherein each of the shock protection switches is of a sensing type, having a proximity control with a sensing range up to 8 mm approximately.

10. A linear light-emitting diode (LED) tube lamp, comprising:
    a housing having two ends;
    a light-emitting diode printed circuit board (LED PCB), the LED PCB having LED arrays fixed thereon;
    an LED driver configured to power the LED arrays on the LED PCB, the LED driver having two inputs;
    a degenerate voltage sensing and control mechanism comprising two degenerate voltage sensing and control devices electrically connected to the LED driver in parallel, each degenerate voltage sensing device having four input/output ports; and
    two lamp bases respectively connected to the two ends of the housing, each lamp base having a bi-pin with two pins protruding outwards, the two pins of the bi-pin electrically connected respectively with two of the input/output ports of a respective one of the degenerate voltage sensing and control devices.

11. The linear LED tube lamp of claim 10, wherein each of the two degenerate voltage sensing and control devices comprises a bridge rectifier, each bridge rectifier comprising diodes interconnected with the respective four input/output ports, wherein the diodes in the two bridge rectifiers are partially paired to perform a full-wave rectification of an AC voltage from the AC mains.

12. The linear LED tube lamp of claim 10, wherein the degenerate voltage sensing and control devices are of a non-diode type, implemented by an application-specific integrated circuit (ASIC), a field-programmable gate array (FPGA), or a microcontroller.

* * * * *